United States Patent
Youlton et al.

(10) Patent No.: US 10,358,571 B2
(45) Date of Patent: Jul. 23, 2019

(54) AQUEOUS COATING COMPOSITIONS INCLUDING PHENOLIC RESIN(S)

(71) Applicant: Valspar Sourcing, Inc., Minneapolis, MN (US)

(72) Inventors: Anthony C. Youlton, Wexford, PA (US); Robert M. O'Brien, Monongahela, PA (US); Mary Jo Scandolari, Coraopolis, PA (US)

(73) Assignee: The Sherwin-Williams Company, Cleveland, OH (US)

( * ) Notice: Subject to any disclaimer, the term of this patent is extended or adjusted under 35 U.S.C. 154(b) by 380 days.

(21) Appl. No.: 14/766,943

(22) PCT Filed: Feb. 28, 2014

(86) PCT No.: PCT/US2014/019408
§ 371 (c)(1),
(2) Date: Aug. 10, 2015

(87) PCT Pub. No.: WO2014/134442
PCT Pub. Date: Sep. 4, 2014

(65) Prior Publication Data
US 2015/0376435 A1 Dec. 31, 2015

Related U.S. Application Data

(60) Provisional application No. 61/771,319, filed on Mar. 1, 2013.

(51) Int. Cl.
C09D 133/00 (2006.01)
C09D 161/06 (2006.01)
C09D 133/14 (2006.01)
B65D 25/14 (2006.01)

(52) U.S. Cl.
CPC ........... *C09D 133/00* (2013.01); *B65D 25/14* (2013.01); *C09D 133/14* (2013.01); *C09D 161/06* (2013.01)

(58) Field of Classification Search
CPC .. C09D 133/00; C09D 133/14; C09D 161/06; B65D 25/14
USPC ......................................................... 523/336
See application file for complete search history.

(56) References Cited

U.S. PATENT DOCUMENTS

| | | |
|---|---|---|
| 2,877,922 A | 3/1959 | Cristoforo |
| 4,021,396 A | 5/1977 | Wu |
| 4,124,554 A | 11/1978 | Fry |
| 4,207,222 A | 6/1980 | Blum et al. |
| 4,247,439 A | 1/1981 | Matthews et al. |
| 4,393,119 A | 7/1983 | Concannon |
| 4,442,246 A | 4/1984 | Brown et al. |
| 4,446,258 A * | 5/1984 | Chu ..................... C09D 163/00 523/100 |
| 4,476,262 A | 10/1984 | Chu et al. |
| 4,480,058 A | 10/1984 | Ting et al. |
| 5,296,525 A | 3/1994 | Spencer |
| 5,830,952 A | 11/1998 | Pedersen et al. |
| 6,084,036 A | 7/2000 | Carney et al. |
| 6,087,417 A | 7/2000 | Stevenson et al. |
| 6,143,841 A | 11/2000 | Spittka et al. |
| 6,217,960 B1 | 4/2001 | Groun in't Woud et al. |
| 6,300,428 B1 | 10/2001 | Stevenson et al. |
| 6,476,119 B1 | 11/2002 | Kucera et al. |
| 6,586,505 B1 | 7/2003 | Cronin et al. |
| 7,189,787 B2 | 3/2007 | O'Brien et al. |
| 8,092,876 B2 | 1/2012 | O'Brien et al. |
| 9,862,854 B2 * | 1/2018 | O'Brien ............. C09D 133/068 |
| 2004/0044117 A1 | 3/2004 | Kiefer-Liptak et al. |
| 2004/0132895 A1 | 7/2004 | Ambrose et al. |
| 2006/0199911 A1 | 9/2006 | Markovich et al. |
| 2006/0229415 A1 | 10/2006 | Boyer et al. |
| 2009/0047524 A1 | 2/2009 | Yaoi et al. |
| 2010/0068433 A1 | 3/2010 | Gibanel et al. |
| 2010/0178442 A1 | 7/2010 | O'Brien et al. |
| 2010/0260954 A1 | 10/2010 | Stenson et al. |
| 2011/0220645 A1 | 9/2011 | Niederst et al. |

(Continued)

FOREIGN PATENT DOCUMENTS

CN 101517020 A 8/2009
CN 102264791 A 11/2011
(Continued)

OTHER PUBLICATIONS

Wicks, Zeno et al., Organic Coatings: Science and Technology, vol. 1, pp. 122-132 (John Wiley & Sons: New York, 1992).
(Continued)

*Primary Examiner* — Hannah J Pak
(74) *Attorney, Agent, or Firm* — Kagan Binder, PLLC

(57) ABSTRACT

The present invention relates to strategies by which one or more phenolic resins are provided in aqueous phenolic dispersions in a manner so that the resultant aqueous phenolic dispersions are more easily combined with water-based latex compositions. The principles of the present invention make it much easier to formulate water-based latex compositions in which substantial phenolic resin content can be stably dispersed for long periods of time. In one aspect, the present invention relates to a method of making a coating composition, comprising a) providing an inverted aqueous dispersion comprising i) at least one polymer having one or more polar, hydrophilic groups; and ii) at least one phenolic resin; b) providing a latex composition; and c) blending the latex composition with the aqueous dispersion to form the coating composition.

25 Claims, No Drawings

(56) References Cited

U.S. PATENT DOCUMENTS

| | | |
|---|---|---|
| 2011/0288232 A1 | 11/2011 | Rademacher et al. |
| 2011/0290696 A1 | 12/2011 | Stenson et al. |
| 2012/0125799 A1 | 5/2012 | Doreau et al. |
| 2012/0188785 A1 | 5/2012 | Kainz et al. |
| 2012/0145721 A1 | 6/2012 | Cavallin et al. |
| 2012/0276315 A1 | 11/2012 | Michel et al. |
| 2012/0302690 A1 | 11/2012 | Cunningham et al. |
| 2013/0206756 A1 | 8/2013 | Niederst et al. |
| 2013/0280454 A1 | 10/2013 | Telford et al. |
| 2013/0316109 A1 | 11/2013 | Niederst et al. |
| 2016/0221733 A1 | 8/2016 | Prouvost et al. |
| 2016/0244212 A1 | 8/2016 | Destal et al. |

FOREIGN PATENT DOCUMENTS

| | | |
|---|---|---|
| GB | 1459843 A | 12/1976 |
| WO | 9937722 A1 | 7/1999 |
| WO | 2008036629 A2 | 3/2008 |
| WO | 2008137562 A1 | 11/2008 |
| WO | 2010062928 A1 | 6/2010 |
| WO | WO 2010/097353 A1 | 9/2010 |
| WO | 2011130671 A2 | 10/2011 |
| WO | 2011149449 A1 | 12/2011 |
| WO | WO 2012/089747 A1 | 7/2012 |
| WO | WO 2013/079718 A1 | 6/2013 |
| WO | WO 2013/079719 A1 | 6/2013 |
| WO | WO 2013/098218 | 7/2013 |

OTHER PUBLICATIONS

Plenco, "Phenolic Novolac and Resol Resins" http://www.plenco.com/phenolic-novolac-resol-resins.htm, [retrieved on Jul. 26, 2017], pp. 1-7.

Zeno Wicks, Jr., Frank N. Jones and S. Peter Pappas, Organic Coatings: Science and Technology, vol. 1, pp. 184-186 (John Wiley & Sons: New York, 1992).

Biedermann et al., (2006) "Phenolic resins for can coatings: II. Resoles based on cresol/phenol mixtures or tert. butyl phenol", LWT—Food Science and Technology 39: 647-659.

\* cited by examiner

AQUEOUS COATING COMPOSITIONS INCLUDING PHENOLIC RESIN(S)

PRIORITY CLAIM

The present application claims priority to International Application No. PCT/US2014/019408, filed Feb. 28, 2014, which in turn claims priority under 35 USC § 119(e) from United States Provisional Patent Application having Ser. No. 61/771,319, filed on Mar. 1, 2013, by Youlton et al., and titled AQUEOUS COATING COMPOSITIONS INCLUDING PHENOLIC RESIN(S), wherein the disclosures of these application are incorporated herein by reference in their respective entireties for all purposes.

FIELD OF THE INVENTION

The present invention relates to coating compositions and resultant coatings that incorporate one or more phenolic resins. More specifically, the present invention relates to water-based compositions including one or more phenolic resins.

BACKGROUND OF THE INVENTION

A wide variety of coatings have been used to coat the surfaces of packaging articles (e.g., food and beverage cans). For example, light metal packaging cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed article or components thereof and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments and/or packaged products.

Phenolic resins have been used widely in coatings used in food and beverage containers as well as in other coating applications. Phenolic resins offer many benefits. In addition to being relatively low cost, phenolic resins protect substrates against staining, corrosion, moisture damage, acid damage, alkaline damage, and other chemical damage. They also impart coating hardness and protect substrates against physical damage. Phenolic resins also can be used as cross-linking agents in combination with other thermosetting resins having complementary curing functionality.

Phenolic resins have been most widely used in coating compositions in which the coating solids are dispersed in organic liquid carriers with only a minor amount of water, if any. Yet, water-based coating compositions are in high demand. A water-based composition uses a liquid carrier with a significant amount of water, e.g., at least 5 weight percent, even at least 20 weight percent, or even at least 60 weight percent, or even 100 percent water based on the total weight of the liquid carrier. In most modes of practice in the coating industry, water-based compositions use water in combination with one or more organic solvents.

Because of the many benefits and advantages offered by phenolic resins, it would be desirable to use phenolic resin(s) in water-based latex compositions. A water-based latex composition refers to a composition that includes dispersed polymer particles, often sub-micrometer in size, in which the polymer particles are prepared via emulsion polymerization in a liquid carrier in which the continuous phase is aqueous. Incorporating phenolic content into latex compositions is not easy. Unfortunately, most phenolic resins are incompatible with water-based latex compositions. This makes it difficult to add sufficient phenolic resin content to existing latex compositions in a manner that allows the phenolic resins to be stably dispersed in the latex composition for long periods of time. Further, many emulsion polymerization processes are intolerant to the presence of phenolic resin content, because a phenolic resin tends to function as a chain terminating agent to prevent an adequate degree of polymerization. This makes it difficult to prepare a latex composition in situ with phenolic material already present. Accordingly, there is a strong demand for strategies that make it easier to incorporate one or more phenolic resins into water-based latex compositions.

SUMMARY OF THE INVENTION

The present invention relates to strategies by which one or more phenolic resins are provided in aqueous phenolic dispersions in a manner so that the resultant aqueous phenolic dispersions are more easily combined with water-based latex compositions. The principles of the present invention make it much easier to formulate water-based latex compositions in which substantial phenolic resin content can be stably dispersed for long periods of time.

Aqueous phenolic dispersions of the present invention are prepared by an inversion process that dramatically improves the stability and compatibility of phenolic resins in water-based latex compositions. Conventionally, many phenolic resins cannot be stably dispersed in latex media even in the presence of reasonable amounts of surfactant(s) and/or dispersant(s). If added directly to latex media, conventionally such phenolic resins tend to rapidly settle out or otherwise coagulate or flocculate. The inversion strategies of the present invention advantageously allow the same kinds of phenolic resins to be stably dispersed in latex media for extended time periods, e.g., months in illustrative embodiments. Remarkably, the inversion strategy of the present invention improves not only the aqueous compatibility of the phenolic resin(s) present during the inversion, but also additional phenolic resin content For example, according to representative modes of practice, additional phenolic resin(s) can be (i) added either to the inverted dispersion prior to combining all or a portion of the inverted dispersion with a latex and/or (ii) added to the latex after the latex is blended with all or a portion of the inverted dispersion and/or (iii) added to the latex prior to combining the latex with all or a portion of the inverted aqueous phenolic dispersion.

The inverted aqueous dispersions are particularly useful ingredients in latex coating compositions where the phenolic content provides many advantages. Phenolic resins protect substrates against staining, corrosion, moisture damage, acid damage, alkaline damage, and other chemical or physical damage. They also impart coating hardness. Phenolic resins also tend to be low cost. Many embodiments are approved for food and beverage contact, making corresponding coatings useful for protecting food and beverage containers. Via enhanced compatibility with water, the present invention allows not only the modified phenolic resin but also other phenolic resins to be more easily incorporated into water-based coating compositions and resultant cured coatings.

Due to the properties and advantages of the present invention, the water-based latex compositions are useful to form cured protective and/or structural coatings on metallic substrates such as the interior and/or exterior of food or beverage containers. Other metallic substrates that may be protected by the resultant coatings include industrial drums or other storage containers or tanks, reaction vessels, appliances, work surfaces, furniture, plumbing pipes, construction components, vehicle components, bridges or other roadway components, aircraft, marine vessels, docks, pipes, and the like. The coatings may be used as protective coatings over one or more underlying coatings or as primer layers under one or more overlying layers. Protective coatings optionally may be reinforced with fibers or woven or non-woven cloths such as fiberglass, polyaramid, polyester, polyamide, acrylic resin, cellulosic fibers, combinations of these, or the like.

In one aspect, the present invention relates to a method of making a coating composition, comprising:
a) providing an inverted aqueous dispersion comprising:
  i) at least one polymer having one or more polar, hydrophilic groups; and
  ii) at least one phenolic resin;
b) providing a latex composition; and
c) blending the latex composition with the aqueous dispersion to form the coating composition.

In one aspect, the present invention relates to a method of making a coating composition, comprising:
a) providing a first composition, comprising:
  i) an organic solvent component comprising at least one organic solvent, wherein the organic solvent component is present as a continuous fluid phase of the first composition; and
  ii) a polymer component comprising at least one polymer having one or more polar, hydrophilic groups;
b) blending the first composition with at least one phenolic resin to form a second composition;
c) mixing the second composition with an amount of at least one aqueous medium effective to form an aqueous dispersion comprising an aqueous liquid carrier as a continuous phase;
d) providing a latex composition; and
e) blending the latex composition with the aqueous dispersion to form the coating composition.

In one aspect, the present invention relates to a food or beverage container, comprising:
a) a metallic surface; and
b) at least one coating provided on the surface, said coating being derived from the coating composition according to any preceding claim.

In one aspect, the present invention relates to a coating composition derived from blending ingredients comprising:
a) an inverted aqueous dispersion comprising:
  i) at least one resin having one or more polar, hydrophilic groups; and
  ii) at least one phenolic resin; and
b) a latex composition.

In one aspect, the present invention relates to a method of using the coating composition described herein to coat a surface of a food or beverage container.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. All patents, pending patent applications, published patent applications, and technical articles cited herein are incorporated herein by reference in their respective entireties for all purposes.

An inverted aqueous dispersion of the present invention comprises at least one phenolic resin and at least one polymer having one or more polar, hydrophilic groups. As used herein, the term "resin" refers to an oligomer and/or a polymer. An oligomer refers to a compound incorporating from two to ten repeating units. A polymer refers to a compound incorporating 11 or more repeating units. Repeating units typically are derived from one or more monomers. A monomer generally includes at least one polymerizable moiety and generally constitutes a single repeating block when incorporated into an oligomer or polymer. A monomer may be incorporated into oligomers or polymers via co-polymerization with itself or with one or more other kinds of monomers, oligomers, and/or polymers. Non-polymerizable terminal moieties, e.g., a monoalcohol or alkoxy group, are not considered repeating units for purposes of the present invention. The repeating units incorporated into oligomers and/or polymers may be the same or different. Unless otherwise expressly indicated, the terms "homo-oligomer" or "homopolymer" refer to compounds incorporating one kind of repeating unit. The terms "co-oligomer" and "copolymer" refer to compounds incorporating two or more different kinds of repeating units. The term "oligomer" encompasses both homo-oligomers and co-oligomers. The term "polymer" encompasses both homopolymers and copolymers.

As used herein, "dispersion" refers to a composition in which at least one discontinuous phase, often in the form of one or more kinds of particles, is dispersed in a second, continuous, liquid phase. The liquid continuous phase often is referred to as a liquid carrier.

As used herein, "aqueous" refers to a composition, e.g., solution, dispersion, or latex, etc., in which the solvent ingredients (e.g., water and optional organic solvents, if any) of the continuous phase include at least 40 weight percent by weight of water based on the total weight of the solvent ingredients. More preferably, "aqueous" refers to a liquid carrier for which the water desirably constitutes at least 50 weight percent, more preferably at least 60 weight percent, even more preferably at least 80 weight percent, or even as much as 99 or even 100 weight percent of the liquid carrier based on the total weight of the liquid carrier.

As used herein, "organic" refers to a composition in which the solvent ingredients of the continuous phase include one or more organic solvents and optionally a limited amount of water with the proviso that the solvent ingredients include less than 60 weight percent, even less than 50 weight percent, preferably less than 40 weight percent, preferably less than 20 weight percent, more preferably less than 1 weight percent of water based on the total weight of the liquid carrier.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polymer can be interpreted to mean that the coating composition includes "one or more" polymers.

Also herein, the recitations of numerical ranges by endpoints include all numbers subsumed within that range (e.g., 1 to 5 includes 1, 1.5, 2, 2.75, 3, 3.80, 4, 5, etc.).

A wide range of one or more optional organic solvents may be used in aqueous and/or organic liquid carriers, if desired. An organic solvent will be deemed to form a single liquid phase with water when an admixture of 5 parts by weight of the organic solvent and 95 parts by weight of water are a single phase at equilibrium at 25° C. Examples of suitable organic solvents include one or more of at least one alcohol (methanol, ethanol, isopropanol, butanol, and/or the like); at least one glycol; at least one ether, compounds containing both ether and OH (e.g., a glycol ether such as monobutyl ether of ethylene glycol or diethylene glycol); tetrahydrofuran; propylene carbonate; at least one ketone (acetone, methyl ethyl ketone, and/or the like); combinations of these, and the like.

The amount of liquid carrier included in the inverted aqueous dispersion may vary over a wide range. In many embodiments, using at least about 50 weight percent, preferably at least 60 weight percent, more preferably at least 70 weight percent would be suitable based on the total weight of the coating composition. In many embodiments, the liquid carrier constitutes no more than 90 weight percent, preferably no more than 80 weight percent of the coating composition based on the total weight of the coating composition.

A phenolic resin is a resin that comprises two or more phenolic repeating units. The term "phenolic" with respect to a repeating unit refers to a structure that is a residue of a reactant that comprised at least one OH directly attached to an aromatic ring structure, more typically a ring structure having six atoms in the ring (e.g., a substituted benzene ring). In many instances, a phenolic resin is obtained by reacting one or more substituted or unsubstituted phenol reactants with one or more aldehydes. Examples of phenol reactants include phenol itself as well as substituted phenols. Illustrative substituted phenols often may be mono-substituted or di-substituted. If substituted phenols are used, these are preferably mono-substituted so that two sites remain for chain growth. Examples of substituted phenols include one or more of o-cresol, p-phenylphenol, p-tert-butylphenol, p-tert-amylphenol, cyclopentylphenol, p-tertoctyl phenol, bisphenol A, resorcinol, xylenol, cresylic acid, bisphenol-F, combinations of these and the like. Examples of additional suitable substituted phenols include any of those disclosed in U.S. application Ser. Nos. 13/570,632, 13/570,743, 61/681,394, and 61/681,434. Derivatives of these reactants, such as etherified or acid functional derivatives, also may be used. Examples of aldehydes include one or more of formaldehyde, furfural, and/or acetaldehyde.

Phenolic resins generally may be classed as either novolacs or resoles. A novolac resin is a phenolic resin in which an excess of phenolic reactant is used relative to aldehyde. These are often prepared using acidic catalyst(s). Novolac resins are referred to as two stage resins as these require both heat and a curing agent for curing. A resole resin is a phenolic resin in which an excess of aldehyde is used relative to phenolic reactant. These are often prepared using alkaline catalyst(s). Resole resins are referred to as one stage resins as these can cure via heat alone without requiring the presence of a curing agent. Upon exposure to sufficient heat, resole resins are self-crosslinking. However, as an option, curing agents may still be used with resole resins if desired. The present invention may use novolac and/or resole resins. Resole resins are preferred.

Phenolic resins desirably have a number average molecular weight sufficiently high such that the resin includes 2 to 50, preferably 5 to 30, more preferably 10 to 20 phenolic repeating units on average.

Suitable phenolic resins also are described in Zeno Wicks, Jr., Frank N. Jones and S. Peter Pappas, *Organic Coatings: Science and Technology*, Vol. 1, pp. 184-186 (John Wiley & Sons: New York, 1992). Suitable phenolic resins also are commercially available. Examples include one or more of the resins available as BAKELITE 6470, 6535LB, 6581LB, and 6812LB products (each available from Hexion Specialty Chemicals GmbH); the DUREZ 33160, 33162 and 33310 products (Durez Corporation, Addison, Tex.); the Varcum 29-401 and 29-115 products (Durez Corporation, Addison, Tex.); PHENODUR PR 285 55/IB/B, PR 516/60B, PR 812, and PR 897 products (each available from CYTEC Surface Specialties, Smyrna, Ga.); the SANTOLINK EP 560 product; the SFC 112 and 142 products (each available from the SI Group, previously Schenectady), and mixtures thereof. Other trade designations for phenolic resins include RESINOX™ from Monsanto Chemical Co. (St. Louis, Mo.); AROFENE™ and AROTAP™ from Ashland Chemical Co. (Dublin, Ohio).

The phenolic resin(s) can be included in the inverted aqueous dispersion in an amount within a wide range. In illustrative embodiments, an inverted aqueous dispersion comprises from about 0.05 to about 25 parts by weight, preferably from about 2 to about 20 parts by weight, more preferably from about 8 to about 15 parts by weight of one or more phenolic resins per 100 parts by weight of the aqueous dispersion. The amount of phenolic resin(s) included in the aqueous dispersion relative to the total solids content of the final coating composition also may selected to be within a wide range. In illustrative embodiments, an inverted aqueous dispersion comprises from about 1 to about 80 parts by weight, preferably from about 5 to about 70 parts by weight, more preferably from about 5 to about 40 parts by weight of one or more phenolic resins per 100 parts by weight of the solids included in the resultant coating composition.

The inverted aqueous dispersion preferably includes at least one resin having one or more polar, hydrophilic groups. As used herein, a polar, hydrophilic moiety generally refers to a moiety comprising at least one electronegative atom that imparts the ability of the moiety to undergo hydrogen bonding with other polar groups and/or aqueous liquid carriers. Electronegative atoms include O, N, P, S, B, combinations of these, and the like. Polar groups can be charged or uncharged. Suitable charged polar groups include cationic or anionic salt groups. Representative examples of polar groups include hydroxyl, sulfhydryl, carbonyl, (meth) acrylonitrile, carboxylic acid or salts thereof, anhydrides of dicarboxylic acids or salts thereof, charged amino (—NH3+), phosphoric acid or salts thereof, phosphonic acid or salts thereof, sulfuric acid or salts thereof, sulfonic acid or salts thereof, nitrate, carbonate, quaternary ammonium, oxirane, ethoxy, methoxy, combinations of these, and the like. In some embodiments, carboxylic acids or salts thereof (e.g., amine neutralized carboxylic acid moieties) are preferred.

The amount of polar, hydrophilic functionality included in an illustrative resin having one or more polar, hydrophilic groups can vary over a wide range. In some instances, such as for a water soluble polyethylene glycol or the like, substantially the entire molecule is made from hydrophilic, polar —$CH_2CH_2O$— repeating units and/or similar hydrophilic alkoxylene moieties. In other instances, an illustrative resin having one or more polar, hydrophilic groups might have a molar equivalent weight of one or more polar, hydrophilic moieties per: 30 to 10,000 grams, preferably 50 to 2000, more preferably 50 to 1000 grams of the resin.

The polar, hydrophilic resin(s) can be included in the aqueous dispersion in an amount within a wide range. In illustrative embodiments, an inverted aqueous dispersion comprises from about 0.5 to 25 parts by weight, preferably 1 to 20 parts by weight, more preferably 10 to 20 parts by weight of one or more polar, hydrophilic resins per 100 parts by weight of the aqueous dispersion.

The weight ratio of the phenolic resin(s) to the polar, hydrophilic resin(s) can vary over a wide range. Exemplary weight ratios of phenolic resin(s) to polar, hydrophilic resin(s) can be in a range of from 1:500 to 500:1, preferably from 1:50 to 50:1; more preferably 1:10 to 10:1.

Illustrative polar, hydrophilic resin(s) may have a number average molecular weight ($M_n$) of at least 2,000, preferably at least 3,000, more preferably at least 4,000, and most preferably at least 5,000. Suitable acid-functional polymers will typically have a number average molecular weight ($M_n$) of at most 15,000, preferably at most 12,000, more preferably at most 9,000, and most preferably at most 6,000. As used herein, the term molecular weight refers to the number average molecular weight unless otherwise noted. In many instances, a material such as a polymer or oligomer may be present as a population distribution in which the actual molecular weight of individual molecules varies within the population. The number average molecular weight provides a statistical way to describe the molecular weight of the population as a weighted average of the actual molecular weights of individual molecules. In other instances, such as for smaller monomers, the material might be present predominantly in a single molecular form. In such instances, the actual molecular weight of individual molecules is substantially identical among the population so that the atomic weight and the number average molecular weight of the population are the same. Molecular weight parameters may be determined using any suitable procedures. According to one approach, molecular weight features are determined using size exclusion chromatography.

A wide range of one or more resins may be used as polar, hydrophilic resin(s) in the practice of the present invention. Such resins may be linear, branched, or cyclic; aliphatic or aromatic; saturated or unsaturated; substituted or unsubstituted. Examples of such resins include (meth)acrylic resins (also referred to as vinyl copolymers or free radically polymerized resins); polyesters, polyurethanes, polyamides, polyolefins, polyimides, polyethers, phenolic resins, combinations of these, and the like. Some resins may include more than one type of polymer linkage. For example, polymers including ether and polyester linkages may be used. Blends of different polymer types also may be used. The polar, hydrophilic resin(s) independently may be thermosetting and/or thermoplastic. Thermosetting resins are preferred.

In many suitable embodiments, polar, hydrophilic resins are prepared from one or more free radically reactive reactants, wherein at least one reactant includes the desired hydrophilic, polar functionality(ies) and/or functionality(ies) that can be converted into hydrophilic, polar functionality as or after the resin is formed. Free radically reactive functionality conveniently is reacted to form resins by exposing the functionality to a suitable source of energy. Often, this occurs in the presence of agents (e.g., initiators, etc.) that help promote the desired reaction. The energy source used for achieving polymerization and/or crosslinking of the functionality may be actinic (e.g., radiation having a wavelength in the ultraviolet or visible region of the spectrum), accelerated particles (e.g., electron beam radiation), thermal (e.g., heat or infrared radiation), acoustic energy, combinations of these, or the like. Ethylenically unsaturated monomers are exemplary free radically reactive reactants. Representative examples of free radically reactive functionality include the carbon-carbon double bonds of (meth)acrylate groups or (meth)acrylic acid groups, olefinic groups, allyloxy groups, alpha-methyl styrene groups, (meth)acrylamide groups, (meth)acrylonitrile groups, vinyl ether groups, combinations of these, and the like. The term "(meth)acryl", as used herein, encompasses acryl and/or methacryl unless otherwise expressly stated. For example, the term "(meth)acrylic acid encompasses acrylic acid and/or methacrylic acid.

The polar, hydrophilic functional resins can be prepared by reacting suitable monomers, in proper amounts, either neat or in a suitable carrier (e.g., an organic liquid carrier). Preferably, the liquid medium for the reaction, if any, is an alcohol-containing mixture. A catalyst or reaction initiator ordinarily is used in the reaction in the usual amounts. Any suitable free radical initiator may be used. Azoalkanes, peroxides, tertiary butyl perbenzoate, t-butyl peroctoate, benzoyl peroxide, tertiary butyl peroxypivalate, and tertiary butyl peroxyisobutyrate are suitable.

In many modes of practice, a free radically polymerized resin with polar, hydrophilic functionality is obtained from one or more free radically polymerizable monomers having polar, hydrophilic functionality and other optional, co-reactive monomers. Preferred polar, hydrophilic functional resins include those prepared from reaction mixtures including at least 10 wt. %, preferably at least 15 wt. %, more preferably at least 20 wt. %, unsaturated monomer(s) with polar, hydrophilic functionality and the balance other free radically reactive monomer(s). The choice of the other free radically reactive monomer(s) is dictated by the intended end use of the coating composition and is practically unlimited. This reaction is conveniently carried out in solution, though neat processes may be used if desired.

According to one illustrative approach using free radical reactive techniques, a pre-mix of one or more polar, hydrophilic functional monomers, other monomers, and initiator is prepared. In preferred embodiments, the one or more polar, hydrophilic functional monomers are ethylenically unsaturated monomers. A portion of the mixture is added to a reaction vessel under a protected nitrogen blanket. Solvent may be added. The contents are heated with stirring to a suitable reaction temperature such as 93° C. External heating stops while the mixture heats further due to an exotherm, such as to 97° C. to 100° C. After a suitable holding time, e.g., 15 minutes, the remaining pre-mix is added over an extended time period, such as two hours, while maintaining the temperature at 97° C. to 100° C. If foaming is observed, the rate of stirring can be reduced and/or defoaming agent(s) may be used. After an additional holding time, e.g., an additional hour, heating is discontinued, and additional solvent may be added. The resultant reaction product would be a composition comprising a polar, hydrophilic functional resin suitable for practicing the present invention.

A wide variety of free radically reactive reactants incorporating polar hydrophilic functionality may be used singly or in combination. In one mode of practice, one or more free radically reactive reactants comprising acid (or salt thereof) and/or acid anhydride functionality may be used to incorporate such polar, hydrophilic functionality into the resulting free radically polymerized resin (hereinafter referred to as acid functionalized resin). The resultant acid functionalized resins may have an acid number over a wide range. Acid numbers are typically expressed as milligrams of KOH required to titrate a 1-gram sample to a specified end point at which the acid functionality is neutralized. The range of suitable acid numbers may vary depending on a variety of considerations including, for example, the degree of water dispersibility that might be desired. The acid functionalized resin preferably has an acid number of at least 15, preferably at least 40, and more preferably at least 100, milligrams (mg) KOH per gram resin. Desirably, the acid functionalized resin preferably has an acid number of no greater than 400, and more preferably no greater than 300, mg KOH per gram resin.

Methods for determining acid numbers are well known in the art. For example, acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

In some embodiments, using acid anhydride functional reactants to provide at least a portion of the polar, hydrophilic functionality(ies) is preferred. Suitable acid anhydride-functional monomers include monomers having at least one free radically reactive moiety, such as a carbon-carbon double bond, and at least one acid anhydride group. Preferred monomers have from 3 to 20 carbons, unsaturation, and from 1 to 5 anhydride groups. Examples of such monomers include maleic anhydride, (meth)acrylic anhydride, cis and/or trans fumaric acid, cis-aconitic acid anhydride, endo-Bicyclo[2.2.2]oct-5-ene-2,3-dicarboxylic anhydride, citraconic anhydride, combinations of these, and the like.

In addition to or as an alternative to anhydride functional reactants, one or more reactants having acid or acid salt may be used. Illustrative examples of these may be represented by the structure $CH_2=C(R^3)COOH$, where $R^3$ is hydrogen or an alkyl group of 1 to 6 carbon atoms. Suitable dibasic acids are those represented by the formulas $R^4(COOH)C=C(COOH)R^5$ and $R^4(R^5)C=C(COOH)R^6COOH$, where $R^4$ and $R^5$ are hydrogen, an alkyl group of 1-8 carbon atoms, halogen, cycloalkyl of 3 to 7 carbon atoms or phenyl, and $R^6$ is an alkylene group of 1 to 6 carbon atoms. Half-esters of these acids with alkanols of 1 to 8 carbon atoms are also suitable. Compounds of the structure $CH_2=C(R^3)$—COOH, or salts thereof, can be present in any suitable amount, including, e.g., in an amount of at least 5%, at least 10%, at least 20%, at least 30%, at least 40%, at least 50%, based on the weight of the co-reactive species in the reaction mixture used to form the polar, hydrophilic resin.

Non-limiting examples of free radically reactive acids and anhydrides include, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof. If desired, salts of the above acids may also be employed.

Many suitable acid functional resins are commercially available. One example includes the SMA1000 copolymer (styrene and maleic anhydride) available from Sartomer, and/or the like.

In other modes of practice, one or more free radically reactive reactants comprising epoxy functionality may be used to incorporate epoxide functionality (epoxide functionality also is referred to as oxirane or glycidyl functionality) into the resulting free radically polymerized resin. Epoxy functional material also can be used to form stronger polar functionality into a resin. For example, U.S. Pat. Nos. 7,189,787 and 8,092,876 describe separately making an acid functional resin and an epoxy functional resin, and then these are reacted in the presence of a tertiary amine to form a reaction product with a quaternary polar group. Using a sufficient amount of the epoxide group-containing reactant also can contribute to improved stability of the resultant coating composition. In addition, using a sufficient amount of the epoxide group-containing monomer can contribute to crosslinking. Consequently, the reaction mixture used to form an epoxide functional resin preferably contains at least 0.1 wt. %, more preferably at least 1 wt. %, of an epoxide group-containing reactant, based on the weight of the co-reactive species in the reaction mixture.

On the other hand, using too much of an epoxide group-containing monomer can diminish film properties, e.g., resultant coatings could be too brittle. Consequently, the reaction mixture preferably contains no greater than 30 wt. %, more preferably no greater than 20 wt. %, even more preferably no greater than 10 wt. %, and optimally no greater than 9 wt. %, of the epoxide group-containing monomer, based on the total weight of the co-reactive species in the reaction mixture.

Suitable epoxide-functional monomers include monomers having free radically reactive functionality, e.g., a reactive carbon-carbon double bond, and at least one epoxide group. Typically, the monomer is a glycidyl ether or ester of an alpha, beta-unsaturated acid, or anhydride thereof (i.e., an epoxide group-containing alpha, beta-ethylenically unsaturated monomer). Suitable alpha, beta-unsaturated acids include monocarboxylic acids or dicarboxylic acids. Examples of such carboxylic acids include, but are not limited to, acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Specific examples of suitable monomers containing an epoxide group are glycidyl (meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the epoxide-functional monomer. A preferred monomer is glycidyl methacrylate ("GMA").

Preferred compositions are substantially free of mobile bisphenol A (BPA), bisphenol F (BPF), bisphenol S (BPS), glycidyl ether compounds thereof (e.g., BADGE, BADGE, and epoxy novalacs), more preferably essentially free of these compounds, even more preferably essentially completely free of these compounds, and most preferably completely free of these compounds. The coating composition is also preferably substantially free of bound BPA, BPF, BPS, glycidyl ether compounds thereof, and epoxy novolacs, more preferably essentially free of these compounds, most preferably essentially completely free of these compounds, and optimally completely free of these compounds. The term "substantially free" of a particular mobile compound means that the compositions of the present invention contain less than 1000 parts per million (ppm) of the recited mobile compound. The term "essentially free" of a particular mobile compound means that the compositions of the present invention contain less than 100 parts per million (ppm) of the recited mobile compound. The term "essentially completely free" of a particular mobile compound means that the compositions of the present invention contain less than 5 parts per million (ppm) of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically, approximate film weight of 1 mg/cm2) is exposed to a test medium for some defined set of conditions, depending on the end use. An example of these testing conditions is exposure of the cured coating to 10 weight percent ethanol solution for two hours at 121° C. followed by exposure for 10 days in the solution at 49° C.

In other modes of practice, one or more free radically reactive reactants comprising hydroxyl functionality may be used to incorporate hydroxyl functionality into the resulting free radically polymerized resin. Examples of hydroxyl functional monomers include hydroxyalkyl (meth)acrylate monomers such as hydroxyethyl acrylate, hydroxypropyl acrylate, hydroxyethyl methacrylate, hydroxypropyl methacrylate or mixtures thereof.

In some modes of practice, one or more free radically reactive reactants comprising nitrile functionality may be used to incorporate nitrile functionality into the resulting free radically polymerized resin. Examples of such reactants include unsaturated nitriles represented by the structure: $R^{11}(R^{12})C=C(R^{13})$—CN, where $R^{11}$ and $R^{12}$ are independently hydrogen, an alkyl group of 1 to 18 carbon atoms, tolyl, benzyl or phenyl, and $R^{13}$ is hydrogen or methyl. Most commonly utilized are acrylonitrile and methacrylonitrile. The nitrite reactant(s) can be present, e.g., from 0-40% based on the total weight of the polar, hydrophilic resin(s).

Other suitable reactants include those represented by the structure: Ar—$C(R^8)=C(R^9)(R^{10})$, where $R^8$, $R^9$, and $R^{10}$ are independently hydrogen or an alkyl group of 1 to 5 carbon atoms and Ar is a substituted or unsubstituted aromatic group. Illustrative of these monomers are styrene, halostyrene, methyl styrene, vinyl toluene, vinyl naphthalene, and the like. The aromatic monomers can be present, e.g., from 0-80% of the total weight of the polar, hydrophilic resin, preferably from 5-50%, and most preferably from 5-40%. Styrene is a presently preferred aromatic monomer in some embodiments, in part due to its relatively low cost. In other embodiments, the reactants, the coating composition, and/or the resultant coatings are substantially free of styrene. In other embodiments, the reactants, the coating composition, and/or the coating are substantially free of aromatic reactants.

Other suitable monomers are esters of acrylic acid, methacrylic acid or mixtures thereof with C1-C16 alkanols. Suitable alkyl (meth)acrylates include those having the structure: $CH_2=(R^1)$—CO—$OR^2$ wherein $R^1$ is hydrogen or methyl, and $R^2$ is an alkyl group preferably containing one to sixteen carbon atoms. The $R^2$ group can be substituted with one or more, and typically one to three, moieties such as hydroxy, halo, phenyl, and alkoxy, for example. Suitable alkyl (meth)acrylates therefore encompass hydroxy alkyl (meth)acrylates. The alkyl (meth)acrylate typically is an ester of acrylic or methacrylic acid. Preferably, $R^1$ is hydrogen or methyl and $R^2$ is an alkyl group having two to eight carbon atoms. Most preferably, $R^1$ is hydrogen or methyl and $R^2$ is an alkyl group having two to four carbon atoms. Examples of suitable alkyl (meth)acrylates include, but are not limited to, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, combinations of these, and the like. Preferred esters are the methyl, ethyl, propyl, n-butyl isobutyl, and 2-ethylhexyl esters of acrylic acid or methacrylic acid or mixtures of such esters.

Difunctional (meth)acrylate monomers may be used in the monomer mixture as well. Examples include ethylene glycol di(meth)acrylate, 1,6-hexanediol di(meth)acrylate, allyl methacrylate, and the like. Other suitable free radically polymerizable monomers include one or more of isoprene, diallylphthalate, divinylbenzene, conjugated butadiene, and mixtures thereof.

Other suitable polymerizable vinyl monomers for use in the ethylenically unsaturated monomer component include acrylonitrile, acrylamide, methacrylamide, methacrylonitrile, vinyl acetate, vinyl propionate, vinyl butyrate, vinyl stearate, N-isobutoxymethyl acrylamide, N-butoxymethyl acrylamide, and the like.

Preferably, at least 40 wt. %, more preferably at least 50 wt. % of the co-reactive species in the reaction mixture will be selected from one or more alkyl acrylates and methacrylates, wherein it is preferred that at least a portion of the alkyl (meth)acrylates include hydroxy functionality. In some embodiments, at least 20 wt. %, more preferably at least 30 wt. %, will be selected from free radically reactive aromatic compounds such as styrene.

In one preferred embodiment, an acid- or anhydride-functional resin is prepared from a reaction mixture that includes a free radically reactive aromatic compound (e.g., Ar—$C(R^8)=C(R^9)(R^{10})$, an alkyl (meth)acrylate, and an acid- or anhydride-functional monomer. For example, such a resin can be prepared from a reaction mixture that includes (by weight) 5 to 20 parts of vinyl aromatic compound (e.g., styrene), 30 to 70 parts alkyl (meth)acrylate, and 30 to 70 parts acid- or anhydride-functional monomer. In one specific embodiment, the acid- or anhydride-functional polymer can be prepared from a reaction mixture that includes (by weight) 10 parts styrene, 45 butyl methacrylate, and 45 parts acid- or anhydride-functional monomer. In another specific embodiment, the acid- or anhydride-functional resin can be prepared from a reaction mixture that includes (by weight) 30 parts styrene, 10 parts ethyl acrylate, and 60 parts acid- or anhydride-functional monomer. In another embodiment, an acid- or anhydride-functional resin is prepared from a reaction mixture that includes 30 parts by weight maleic anhydride and 70 parts by weight of styrene. In some modes of practice, the reactants are selected from those permitted under "21 CFR § 175.300 FDA" and/or comply with the European regulation "2002/72/EC".

Optionally, a desired polar, hydrophilic functionality may be incorporated into the resin by suitable reaction after the resin is formed. For example, U.S. Pat. Nos. 7,189,787 and 8,092,876 teach how to convert at least a portion of epoxide functionality and acid functionality into quaternary ammonium functionality by reacting at least one epoxide functional resin with at least one acid functionality in the presence of at least one tertiary amine. Any epoxy functional resin can be used in this reaction, including the epoxy functional resins obtained by free radical reaction as described above. Similarly, any resin having acid functionality, acid anhydride functionality, or salt thereof may be used as the acid functional resin in this reaction, including the free radically reacted resins with such functionality as described above.

As another alternative, the functionality may be provided by reaction as the resin is formed. For example, U.S. Pat. No. 8,092,876 teaches how to form quaternary ammonium functionality as a resin is formed from free radically reactive epoxide functional and other co-reactive ingredients in the presence of an amine (e.g., a tertiary amine) and acid functionality in an aqueous reaction medium. This reaction optionally may take place in the presence of other, pre-formed resin materials if desired, as taught by U.S. Pat. No. 8,092,876. Each of U.S. Pat. Nos. 7,189,787, 8,092,876, US Pub. No. 2011/0288232, and International App. No. WO/2012/089747, is incorporated herein by reference in its respective entirety.

In the practice of the present invention, the acid functionality and/or tertiary amine functionality used to form quaternary ammonium functionality from epoxide functionality may be present in the epoxide functional material itself and/or provided via separate reaction ingredients. Desirably, the acid functionality is provided on a separate resin ingredient via one or more separate acid functional resins (such as those described above).

The reactions to form quaternary ammonium functionality as taught by U.S. Pat. Nos. 7,189,787 and 8,092,876 may consume all or only a portion of the epoxide functionality of an epoxide functional resin. Accordingly, even though the coating composition may be derived from a resin or resin reactants that are epoxide functional as supplied, the epoxide functionality may or may not be present in the resultant coating composition. Similarly, all or only a portion of the acid functionality may be consumed by the reaction to form acid anion functionality so that the resultant coating composition may or may not have residual acid functionality.

The reactions to form quaternary ammonium functionality as taught by U.S. Pat. Nos. 7,189,787 and 8,092,876 preferably use an amine, more preferably a tertiary amine. Some examples of suitable tertiary amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Most preferably triethyl amine or dimethyl ethanol amine is used as the tertiary amine.

Other examples of tertiary amines are disclosed, for example, in U.S. Pat. Nos. 6,300,428; 6,087,417; 4,247,439; 5,830,952; 4,021,396; 5,296,525; 4,480,058; 4,442,246; 4,446,258; and 4,476,262, which are herein incorporated by reference.

The reactions to form quaternary ammonium functionality as taught by U.S. Pat. Nos. 7,189,787 and 8,092,876 are thought to compete with reactions that form ester functionality. In many modes of practice, it is believed to be desirable to minimize the ester-forming reaction while favoring the formation of the quaternary ammonium functionality. This can be accomplished by using a stoichiometric excess of amine relative to epoxide functionality. It also has been discovered that the stoichiometric ratio of amine to oxirane (A:Ox) can influence the viscosity of the composition. In general as the A:Ox ratio increases, viscosity decreases. This also favors using a stoichiometric excess of amine to epoxide. It should be noted that this trend may not always be true as dispersion conditions have been found to also impact viscosity.

Consequently, the A:Ox ratio desirably is at least 0.8:1, more preferably at least 2:1, and most preferably at least 2.5:1. Preferably the A:Ox ratio is at most 5:1, more preferably at most 4:1, and most preferably at most 3.5:1. Additional amine may be added after the polymer has been dispersed to further adjust viscosity.

The inverted aqueous dispersion may include one or more other optional resins, if desired. Such resins can be used for a variety of purposes, such as to modify rheology, to enhance mechanical or other physical properties, as fillers, to promote adhesion, to provide crosslinking, and/or the like. Such additional resins may be co-reactive or non-reactive with other resin components of the coating composition. Examples include one or more polyethers, polyurethanes, other free radically reacted resins (also referred to as vinyl addition polymers and copolymers or as (meth)acrylic resins), polyimides, polyamides, polyesters, fluoropolymers, polysiloxanes, combinations of these, and the like. The amount of such additional polymers (if any) may vary over a wide range. In illustrative modes of practice, using 0.1 to 300 parts by weight of one or more of such additional polymers per 100 parts by weight of hydrophilically modified phenolic resin(s) would be suitable.

In addition to the liquid carrier and resin components described above, the inverted aqueous dispersion may include and/or be derived using one or more optional ingredients if desired. Suitable optional additives include, for example, those that improve the processability or manufacturability of the composition, enhance composition aesthetics, or improve a particular functional property or characteristic of the coating composition or the resultant cured compositions, such as adhesion to a substrate or adjacent composition. Additives that may be included are one or more carriers, catalysts, initiators, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, pigments, colorants, waxes, anti-oxidants, anticorrosion agents, flow control agents, thixotropic agents, flow control agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom. U.S. Pat. Nos. 7,189,787 and 8,092,876 further describe such optional ingredients.

According to an illustrative mode of practice, inverted aqueous dispersions are prepared by incorporating ingredients including at least one phenolic resin and at least one polar, hydrophilic resin in an organic solvent. First, at least one polar, hydrophilic resin is dissolved or dispersed in an organic solvent. Examples of suitable organic solvents include one or more of at least one alcohol (methanol, ethanol, isopropanol, butanol, and/or the like); at least one glycol; at least one ether (e.g., a monobutyl ether of ethylene glycol or diethylene glycol); tetrahydrofuran; propylene carbonate; at least one ketone (acetone, methyl ethyl ketone, and/or the like); combinations of these, and the like. Optionally, the organic solvent may include a limited amount of water. Desirably, the organic solvent includes less than 20, even less than 10, preferably less than 5, more preferably less than 1 part by weight of water per 100 parts by weight of organic solvent. More preferably, water is excluded from the organic solvent as much as is practical.

The polar, hydrophilic resin(s) may be pre-formed and then combined with the organic solvent. Alternatively, at least a portion of the hydrophilic resin(s) are formed in the organic solvent in situ, e.g., using techniques as described in U.S. Pat. No. 7,189,787 and U.S. Pat. No. 8,092,876, in one mode of practice, for example, an acid- or anhydride- (or salt thereof) functional resin is formed in situ from free radically reactive ingredients in an organic solvent. In parallel, an epoxy functional resin is formed in situ from free radically reactive ingredients in a separate reaction vessel in an organic solvent that may be the same or different than the solvent used to make the acid functional resin. Either one or both of these compositions may be further worked up if desired to purify, add or delete liquid carrier, remove water, etc., as desired. The two compositions then are combined to form an organic composition comprising the acid functional and epoxy functional resins in an organic liquid carrier. The resultant admixture may be a single phase or may be multiphase, e.g., a dispersion. Next at least one amine (more preferably a tertiary amine) is added to the combined compositions. The amine and resins are then allowed to react. Alternatively, the amine may be pre-reacted with one of the resins which is then reacted with the other resin.

Next, one or more phenolic resins are added to the composition. Phenolic resins tend to be very compatible with organic liquid carriers. Thus, the penolic resins are easily added at this stage. In many embodiments, enough phenolic resin(s) are added so that the weight ratio of phenolic resin(s) to the polar, hydrophilic resin(s) is in the range from 1:10 to 10:1, preferably 1:5 to 5:1, more preferably 1:3 to 3:1.

All or a portion of the final phenolic resin content may be added at this time. Often, it is convenient to add a portion of the phenolic resin content, e.g., from about 10 to 90, preferably 30 to 80 weight percent of the total amount of phenolic resin content, and then add the remainder after inversion. If the resultant inverted composition is to be combined with a latex composition as described below, the additional phenolic content can be added before, during, and/or after combination with the latex composition. Inversion improves the aqueous stability of not only the phenolic resin content present at the time of inversion but also phenolic resin(s) added subsequently. Advantageously, therefore, use of inversion techniques to form the phenolic aqueous dispersion greatly enhances the flexibility by which additional phenolic content can be added. After addition of the phenolic resin(s), the resultant admixture may be a single phase or may be multiphase, e.g., a dispersion. If phenolic resin(s) are added after inversion, these may be added neat or may be pre-dissolved or pre-dispersed in an organic liquid carrier.

Next, the organic composition is inverted, transforming it from being a composition with a continuous organic phase to a composition with a continuous aqueous phase. This is accomplished by adding a sufficient amount of aqueous media at a suitable rate in order to accomplish the inversion. Optionally, a portion of the organic liquid solvent can be removed before, during, and/or after addition of the inverting aqueous media.

Conditions for forming an aqueous dispersion can include consideration of one or more of 1) an appropriate amount of water, 2) addition rate of water, 3) temperature, 4) mix time, and 5) mix rate. Exemplary amounts of water include adding 25 to 75 parts by weight water, preferably 30 to 70 parts by weight water, more preferably 40 to 60 parts by weight of water per 100 parts by weight of the resultant aqueous dispersion. Water can be added in incremental amounts or the entire amount of water can be added at the same time. A portion of the water can be present prior to addition of all or a portion of the phenolic resin content. Exemplary temperature conditions of liquid ingredients during mixing include any temperature at which the composition is a liquid, preferably 50° C. to 105° C., and more preferably 80° C. to 105° C., even more preferably 90° C. to 102° C. Exemplary mix times include 10 minutes to 8 hours, preferably 30 minutes to 4 hours, more preferably 30 minutes to 2 hours.

Optionally, one or more additional ingredients can be incorporated into the resultant aqueous dispersion before, during, or after inversion. For example, additional resin(s) can be added, including additional phenolic resin(s) and/or additional polar, hydrophilic resin(s). Other optional additives as described above can be added as well. In other modes of practice, all or a portion of the optional ingredients can be added prior to addition of the phenolic resin(s). Alternatively, all or a portion of the optional ingredients can be added subsequently before, during, or after the time the inverted aqueous dispersion is combined with a latex composition.

The inverted coating compositions are useful to make a wide variety of water-based coating compositions. According to an illustrative mode of practice, a coating composition is made from ingredients comprising at least one inverted aqueous dispersion described above and at least one latex composition such as any of the latex compositions described in U.S. Pat. No. 8,092,876; WO 2010/097353; and WO 2012/089747; WO 2013/098218; WO 2013/079718; WO2013079719; U.S. Publication No. 2012/0145721; U.S. Pub. No. 2013/0280454; U.S. Pub. No. 2012/0302690; U.S. Provisional App. Ser. Nos. 61/842,043 and 61/842,044 filed on Jul. 2, 2013; the entireties of which are incorporated herein by reference.

Thus, for example, the latex can be a single stage latex or a multi-stage latex. For example, the latex can be a single or multi-stage latex formed using a conventional surfactant (e.g., amine-neutralized dodecyl benzene sulfonic acid). As another example, the latex can be a multi-stage latex which can optionally be formed using a conventional surfactant, a polymeric surfactant, or a combination thereof.

The latex compositions used in the present invention are prepared in some embodiments by techniques known in the art, such as without limitation, suspension polymerization, interfacial polymerization, and emulsion polymerization. Emulsion polymerization techniques for preparing latex emulsions from ethylenically unsaturated monomer components are well known in the polymer arts, and any conventional latex emulsion technique can be used, such as for non-limiting example, single and multiple shot batch processes, and continuous processes. If desired, an ethylenically unsaturated monomer component mixture can be prepared and added gradually to the polymerization vessel. The ethylenically unsaturated monomer component composition within the polymerization vessel may be varied during the course of the polymerization, such as, for non-limiting example, by altering the composition of the ethylenically unsaturated monomer component being fed into the vessel. Both single and multiple stage polymerization techniques can be used in some embodiments of the invention. In some embodiments, the latex emulsions are prepared using a seed polymer emulsion to control the number of particles produced by emulsion polymerization as known in the art. The particle size of the latex polymer particles is controlled in some embodiments by adjusting the initial surfactant charge.

The ethylenically unsaturated monomer component may comprise a single monomer or a mixture of monomers in various embodiments. The ethylenically unsaturated monomer component includes, without limitation, one or more free radically reactive vinyl monomers, (meth)acrylic monomers, allylic monomers, (meth)acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chloro styrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include without limitation, methyl vinyl ether, isopropyl vinyl ether, n-butyl vinyl ether, and isobutyl vinyl ether. (Meth)acrylic monomers include without limitation, monomers such as for non-limiting example, lower alkyl esters of acrylic or methacrylic acid having an alkyl ester portion other than methyl or ethyl containing between about 3 to about 10 carbon atoms, as well as aromatic derivatives of acrylic and methacrylic acid. (Meth)acrylic monomers also include, for non-limiting example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxy 1 alkyl acrylates and methacrylates such as without limitation, hydroxyethyl and hydroxy propyl acrylates and methacrylates, and amino acrylates and methacrylates. Any of the free radically reactive reactants described above with respect to the inverted aqueous dispersion, preferably those that are monomers, also may be used.

One factor that can influence the selection of monomers used in the ethylenically unsaturated monomer component concerns the glass transition temperature (Tg) characteristics of the individual monomers. In many embodiments, the latex polymers individually and/or as a blend exhibit Tg characteristics such that the resultant coating has sufficient flexibility to withstand impacts or flexing of the substrate according to the intended use while still offering sufficient corrosion resistance, abrasion resistance, and hardness. In order to obtain a desired balance of characteristics, a resin will incorporate at least some monomers whose corresponding homopolymer has a Tg of about 25° C. or less and at least some monomers whose corresponding homopolymer has a Tg of greater than 25° C., even greater than 35° C., or even greater than 50° C. In the practice of the present invention, Tg characteristics are determined using differential scanning calorimetry (DSC) techniques.

The ethylenically unsaturated monomer component, the coating compositions, the aqueous phenolic dispersion, the latex compositions combined with the aqueous phenolic dispersion, and/or resultant coatings preferably are prepared without using chlorinated ingredients such as vinyl chloride monomers. Some embodiments of the ethylenically unsaturated monomer component, the coating compositions, the aqueous phenolic dispersion, the latex compositions combined with the aqueous phenolic dispersion, and/or resultant coatings preferably are prepared without using any halogenated ingredients such as chlorinated or fluorinated monomers.

In some embodiments, the ethylenically unsaturated monomer component includes at least one multi-ethylenically unsaturated monomer component effective to raise the molecular weight and crosslink the polymer. Non-limiting examples of multi-ethylenically unsaturated monomer components include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, divinylnaphthalene, and mixtures thereof. In some embodiments, the multi-ethylenically unsaturated monomer component is present in an amount from about 0.1% to about 5% of the reactants used to generate the latex polymer.

In some embodiments of the invention, the ethylenically unsaturated monomer component and at least one stabilizer comprising at least one strong acid are mixed in a carrier to form a monomer emulsion. Optionally, a base is present in the mixture. In some embodiments, the stabilizer is present in an amount from about 0.1% to 2.0% by weight of the emulsion polymerized polymer(s) present in the latex composition.

Non-limiting examples of stabilizers (or "surfactants") include strong acids, such as without limitation, dodecylbenzene sulfonic acid, dinonylnaphthalene sulfonic acid, dinonylnaphthylenedisulfonic acid, bis(2-ethylhexyl)sulfosuccinic acid and the like, including mixtures thereof. In some embodiments, a strong acid is an acid with a dissociation constant in aqueous solution, pK less than about 4. In some embodiments, the strong acid has a hydrophobe attached to the acid. In some embodiments, the strong acid has at least about six carbon atoms.

Non-limiting examples of a base suitable for use in producing the latex include "fugitive" bases such as ammonia, dimethylethanolamine, 2-dimethylamino-2-methyl-1-propanol, any other suitable amine, and mixtures thereof. In some embodiments, the base is present in an amount of about 50% to 100% mole to mole of stabilizer.

In some embodiments, the carrier includes, without limitation, water, a water soluble co-solvent, and mixtures thereof. The carrier is preferably present in an amount of about 50% to about 90% by weight of the total latex composition in some embodiments.

In some embodiments of the invention, the reaction mixture includes one or more initiators to form a latex emulsion. The initiator includes, for non-limiting example, initiators which thermally decompose at the polymerization temperature to generate free radicals. Examples of initiators include, without limitation, both water-soluble and water-insoluble species. Examples of free radical-generating initiators include, for non-limiting example, persulfates, such as without limitation, ammonium or alkali metal (potassium, sodium or lithium) persulfate; azo compounds such as without limitation, 2,2'-azo-bis(isobutyronitrile), 2,2'-azo-bis(2,4-dimethylvaleronitrile), and 1-t-butyl-azocyanocyclohexane; hydroperoxides such as without limitation, t-butyl hydroperoxide and cumene hydroperoxide; peroxides such as without limitation, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as without limitation, t-butyl peracetate, t-butyl perphthalate, and t-butyl perbenzoate; percarbonates, such as without limitation, di(1-cyano-1-methylethyl)peroxy Bicarbonate; perphosphates; and the like.

In some embodiments, the initiator is used alone or as the oxidizing component of a redox system, which includes, without limitation, a reducing component such as, for non-limiting example, ascorbic acid, malic acid, glycolic acid, oxalic acid, lactic acid, thioglycolic acid, or an alkali metal sulfite, such as without limitation, a hydrosulfite, hyposulfite or metabisulfite, such as without limitation, sodium hydrosulfite, potassium hyposulfite and potassium metabisulfite, or sodium formaldehyde sulfoxylate. The reducing component can be referred to as an accelerator or a catalyst activator.

The initiator and accelerator, which can be referred to as an initiator system, are each employed in some embodiments in proportion from about 0.001% to about 5%, based on the weight of ethylenically unsaturated monomer component to be copolymerized. Promoters such as without limitation, chloride and sulfate salts of cobalt, iron, nickel or copper are optionally employed in amounts from about 2 to about 200 parts per million in some embodiments. Non-limiting example of redox catalyst systems include, without limitation, tert-butyl hydroperoxide/sodium formaldehyde sulfoxylate/Fe(II), and ammonium persulfate/sodium bisulfite/sodium hydrosulfite/Fe(II), and combinations thereof. In some embodiments, the polymerization temperature is from about room temperature to about 90° C., and the temperature can be optimized for the initiator system employed, as is conventional.

A latex emulsion can be formed using one or more surfactants (including, e.g., those previously described). For example, a conventional small molecule surfactant can be used, which can optionally be crosslinkable. As another example, the surfactant can include a polymeric surfactant (e.g., a polymer having anionic or cationic groups). In some embodiments of the invention, aggregation of polymeric latex particles is limited by including a stabilizing surfactant during polymerization. For non-limiting example, the growing latex particles can be stabilized during emulsion polymerization by one or more surfactants such as, without limitation, dodecylbenzene sulfonic acid, an anionic or nonionic surfactant, or a mixture thereof, as is well known in the polymerization art. Other types of stabilizing agents, such as, without limitation, protective colloids, can be used in some embodiments. Generally speaking, conventional anionic surfactants with metal, nonionic surfactants containing polyethylene chains and other protective colloids tend to impart water sensitivity to the resulting films. In some embodiments of the invention, it is desirable to minimize or avoid the use of these conventional anionic and nonionic surfactants. In some embodiments, the stabilizing surfactant is employed during seed polymerization.

Any suitable resin, e.g., oligomeric and/or polymeric, surfactant may be used (e.g., an acrylic polymeric surfactant, a polyurethane polymeric surfactant, a polyester polymeric surfactant, an alkyd polymeric surfactant, a copolymer of any of the aforementioned, or mixtures thereof). In some embodiments, the polymeric surfactant is a salt of an acid- or anhydride-functional polymer, more preferably a salt of an acid- or anhydride-functional acrylic polymer such as, e.g., a salt of and acid- or anhydride-functional acrylic polymer and amine. Representative examples of suitable polymeric surfactants are exemplified in U.S. Pat. No. 8,092,876.

In some embodiments (e.g., certain embodiments in which a resin surfactant is used to generate the latex), the latex composition is substantially free of low-molecular weight surfactant (e.g., non-polymeric surfactant having a number average molecular weight of less than 1,000 Daltons or less than 500 Daltons). Representative such latex compositions are exemplified in U.S. Pat. No. 8,092,876.

Chain transfer agents are used in some embodiments of the invention to control the molecular weight of the latex emulsion. Non-limiting examples of chain transfer agents include mercaptans, polymercaptans, polyhalogen compounds, alkyl mercaptans such as without limitation, ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan, mercapto carboxylic acids and their esters, such as without limitation, methyl mercaptopropionate and 3-mercaptopropionic acid, alcohols such as without limitation, isopropanol, isobutanol, lauryl alcohol and t-octyl alcohol, halogenated compounds such as without limitation, carbon tetrachloride, tetrachloro ethylene, trichloro-bromoethane, and combinations thereof. In some embodiments, from about 0 to about 10% by weight, based on the weight of the ethylenically unsaturated monomer component mixture is employed. The latex emulsion molecular weight is controlled in some embodiments by techniques known in the art, such as without limitation, by selecting the ratio of initiator to ethylenically unsaturated monomer component. In some embodiments, as the molecular weight of the latex emulsion increase, the latex emulsion performs more uniformly from batch to batch.

In some embodiments, the initiator system and/or chain transfer agent is dissolved or dispersed in separate fluid mediums or in the same fluid medium, and then gradually added to the polymerization vessel. In some embodiments, the ethylenically unsaturated monomer component, either neat or dissolved or dispersed in a fluid medium, is added simultaneously with the catalyst and/or the chain transfer agent. The catalyst is added to the polymerization mixture to "chase" residual monomer after polymerization has been substantially completed to polymerize the residual monomer as is well known in the polymerization arts. In some embodiments, an additional monomer mixture of an ethylenically unsaturated monomer component and a stabilizer is added to the monomer emulsion. Optionally, a base is present in the additional monomer mixture. The additional monomer mixture can be added to the monomer emulsion in some embodiments prior to addition of the initiator, after addition of the initiator, or both before and after addition of the initiator. The compositions of the ethylenically unsaturated monomer component, stabilizer and base in the additional monomer mixture can be the same as or different than the compositions of these components in the monomer emulsion.

The resultant latex emulsion is reacted with a neutralizer in some embodiments of the invention. In some embodiments, the reaction occurs in the presence of a solvent. For non-limiting example, the solvent includes a ketone, an aromatic solvent, an ester solvent, a hydroxyl functional solvent, or a mixture thereof. In some embodiments, the solvent is present in an amount from about 0% to about 90% by weight polymeric solids.

In some embodiments, the neutralizer includes, without limitation, ammonia, amine (e.g., a tertiary amine, such as, for non-limiting example, dimethylethanolamine, 2-dimethylamino-2-methyl-1-propanol, tributylamine), or a mixture thereof. For non-limiting example, the neutralizer is employed in an amount from about 0% to about 100% based on of the amount of acid to be neutralized in the system.

The latex emulsions can include additional resin ingredients and other additives known to those skilled in the art, such as without limitation, additives to control foam, reduce equilibrium and dynamic surface tension, control rheology and surface lubricity. Amounts can vary depending on desired coating application and performance in any manner known to those skilled in the art. Other optional ingredients include those described above with respect to the inverted aqueous dispersion.

In a preferred mode of practice for making a latex composition, an acid and/or anhydride (or salt thereof) functional resin is prepared in an organic solvent using free radical polymerization techniques. Exemplary resins of this type are described above with respect to the inverted aqueous dispersion. The resultant resin is neutralized with a suitable base such as an amine (more preferably a tertiary amine, examples of which are described above). The organic composition is then inverted to form an aqueous admixture.

In parallel, a premix of free radically reactive monomers preferably comprising at least one epoxy functional monomer (e.g., glycidyl methacrylate and/or glycidyl acrylate), at least one alkyl (meth)acrylate and optionally at least one other monomer (e.g., styrene) is prepared. The monomer pre-mix may be prepared neat or in an organic solvent. Preferred compositions are substantially free of mobile bisphenol A (BPA) and aromatic glycidyl ether compounds (e.g., BADGE, BFDGE, and epoxy novalacs), more preferably essentially free of these compounds, even more preferably essentially completely free of these compounds, and most preferably completely free of these compounds. The coating composition is also preferably substantially free of bound BPA and aromatic glycidyl ether compounds, more preferably essentially free of these compounds, most preferably essentially completely free of these compounds, and optimally completely free of these compounds.

Then, one or more free radical initiators are added to the aqueous admixture including the neutralized resin. The monomer pre-mix is typically added to the aqueous reaction admixture over a suitable time period, although a batch process may be employed if desired. This is preferably done with agitation. Emulsion polymerization of the monomers occurs. To help make sure that all monomers react, additional initiator may be added as the reaction proceeds. The resultant product is a latex composition. Optionally, the latex composition may be worked up to remove by-products or the like.

The latex composition and the inverted aqueous dispersion containing phenolic resin(s) are then combined to form a coating composition. Optionally, a defoaming agent or other desired additives may be added at this stage as well. According to a preferred approach, a first step of this combination involves adding one or more optional additional phenolic resin(s) to the inverted aqueous dispersion. Conventionally, it is challenging to add a phenolic resin to an aqueous dispersion and expect the phenolic resin to be stably dispersed. However, additional phenolic resin content is easily incorporated into the inverted aqueous dispersion of the present invention. Optionally, one or more additional aqueous or organic solvents may be added at this time as well. The resultant aqueous dispersion is preferably mixed thoroughly for a suitable time period.

After mixing, the aqueous coating composition is complete, although additional water or other liquid carrier may be added to bring the coating composition to a desired solids content if desired. Also, coating compositions can include one or more optional ingredients if desired. Suitable optional additives include, for example, the resins and other additives described above with respect to the inverted aqueous dispersion.

The coating compositions of the invention can be applied to a substrate using any suitable procedure such as spray coating, roll coating, coil coating, curtain coating, immersion coating, meniscus coating, kiss coating, blade coating, knife coating, dip coating, slot coating, slide coating, brushing, casting, spin coating, or the like, as well as other types of pre-metered coating. The present coating compositions can be used to produce cured films having a thickness over a wide range. For example, in food and beverage cans, illustrative coatings often have thicknesses in the range from 0.01 mils to 10 mils, preferably 0.05 mils to 5 mils, more preferably 0.1 mils to 0.5 mils, even more preferably 0.1 mils to 0.2 mils.

After applying the coating composition onto a substrate, the composition can be cured using a variety of processes, including, for example, oven baking by either conventional or convectional methods. In preferred embodiments, the coating composition of the present invention is a thermal-cure coating composition. The curing process may be performed in a single step or as discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. Sufficient heat is used to cure the phenolic resins to avoid cure blocking that can occur if the curing heat is too low.

The curing process may be performed at any suitable temperature, including, for example, oven temperatures in the range of about 100° C. to about 230° C., preferably 180° C. to 225° C. for a time period in the range from 5 seconds to 30 minutes. The upper end of suitable curing temperature, however, can change depending on the decomposition temperature of the ingredients used in a particular embodiment. In one embodiment, coatings are cured at 213° C. to 221° C. for 5.5 minutes.

Cured compositions of the present invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. This makes the coating compositions of the present invention particularly useful in single or multilayer coating systems that are used to protect metallic substrates. The inventive coating systems are particularly effective at imparting resistance to attack by acidic and/or staining foodstuffs and beverages. In some modes of practice, therefore, the coating compositions and resultant coatings are useful to protect food and beverage containers to prevent contamination of foodstuffs by the packaging metal, and to prevent attack by the foodstuffs on the metal packaging. The coating systems of the present invention may be in direct contact with the food or beverages.

The coating system also may be used to protect interior or exterior surfaces of metallic packaging surfaces for non-food products, e.g. hair spray, hair dye, paints and stains, joint compound, concrete mixes, glue, cleaning compositions, etching compositions, pharmaceuticals, cosmetics, nutriceuticals, fertilizers, and the like.

A wide variety of container embodiments, or portions thereof, may be protected by the coatings. These include cans, drums; kegs; pails; decorative tins; open trays; tubes, bottles, monoblocs, and the like. The coated closure devices include, but are not limited to, caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans. Cans may be 2-piece cans or 3-piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. The coatings may be applied to any suitable surface, including inside surfaces of containers, outside surfaces of containers, container ends, closures, and combinations thereof.

In an exemplary mode of practice, a coating composition of the present invention is applied as a spray applied coating to an interior of a food or beverage can. The coating composition is particularly useful as an inside spray coating for 2-piece food or beverage cans (e.g., 2-piece drawn and ironed food or beverage cans, which are typically made of either steel or aluminum). Such inside spray coatings are typically applied to the interior surfaces of the bottom end and sidewall portions of the 2-piece can (which form a single "piece" while the top can end which is later attached forms the other "piece"). Preferred embodiments of the coating composition exhibit excellent spray properties and also exhibit excellent flow properties so as to sufficiently flow to produce a continuous film while avoiding unsuitable pooling at the bottom portions of the can. In addition, preferred inside spray coating compositions exhibit suitable drop can properties when subjected to conventional industry drop can testing.

An example of a test useful for assessing the ability of an inside spray coating to resist drop can damage is described below.

Drop damage resistance measures the ability of a coated can to resist cracks after being in conditions simulating dropping of a filled can. An initial metal exposure is first measured, which determines the amount of the inside surface of a can that has not been effectively coated by the sprayed coating. A 12-ounce aluminum beverage can coated on the interior with an inside spray coating composition (e.g., at a dry film weight of 120 milligrams per can) is filled with a room-temperature electrolyte solution (1% NaCl in deionized water). An electrical probe is attached in contact to the outside of the can (uncoated, electrically conducting). A second probe is immersed in the electrolyte solution in the middle of the inside of the can. Metal exposure values can be measured using enamel raters such as a WACO Enamel Rater II, available from the Wilkens-Anderson Company, Chicago, Ill., with an output voltage of 6.3 volts. The measured electrical current, in milliamps, is reported. If any uncoated metal is present on the inside of the can, a current is passed between the two probes and registers as a value on an LED display. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give initial metal exposure values of less than 3 mA, more preferred values of less than 2 mA, and even more preferred values of less than 1 mA, Commercially acceptable initial metal exposure values are typically less than 2.0 mA on average.

After the initial metal exposure is measured, the can is rinsed and filled with 12 ounces of water. A coated commercial beverage can end having a pull tab attached via a rivet is double seamed onto the filled can. The sealed can is dropped bottom-side down (with the can bottom parallel to the ground) through a vertical tube from a height of 24 inches onto a clean and dry inclined plane angled at 45 degrees relative to the ground (with the 24 inch drop height measured from the bottom of the can relative to the point of impact on the incline plane), causing a dent in the chime area of the can. A suitable included plane can consist of quarter-inch think aluminum. The can is then turned 180 degrees, and the process is repeated. Water is then removed from the can and metal exposure is again measured as described above for initial metal exposure. If there is no damage, no change in current (mA) will be observed. Typically, an average of 6 or 12 can runs is recorded. Both metal exposures results before and after the drop are reported. The lower the milliamp value, the better the resistance of the coating to drop damage. Preferred coatings give metal exposure values after drop damage of less than 3.5 mA, more preferred values of less than 2.5 mA, and even more preferred values of less than 1.5 mA.

In the above described method, a 2-piece steel food can (e.g., a 306 D&I steel food can) or beverage may be substituted for the aluminum beverage can to assess drop can resistance in those end uses. In the case of a 2-piece food can, a food can end is used to seal the can and the end is sealed to the can using conventional techniques. For food cans a higher interior dry coating film weight is typically used (e.g., 350 milligrams per can depending on can size). Preferred coatings in these end uses give initial metal exposure values and metal exposure values after drop damage consistent with those described above.

In another mode of practice, a coating composition is used to coat the interior of a metal can for storing pharmaceuticals. A non-limiting example of such a can is an aluminum metered dose inhaler ("MDI") can.

The coatings can be applied onto substrates before, during, or after the substrate is fabricated into containers or portions thereof. The coating compositions of the present invention may, for example, be applied to and cured on a metal substrate, e.g. metal sheet or metal foil, and then the coated substrate may be formed into a coated container device or a coated closure device or components thereof. In the alternative, the metal substrate may be formed into a container device or a closure device or component thereof, and then the container device or the closure device or component thereof is coated to form the coated container device or coated closure device, which may optionally be subjected to additional fabrication steps (e.g., can necking, flanging, etc.).

The coated container devices according to the instant invention may be formed via any suitable method. For example, the coated container device may be formed via stamping, drawing, redrawing, wall ironing, bending, beading, embossing, debossing, flanging, necking, stretching, blow-stretching, and any other suitable conventional method. Such methods are generally known to those having ordinary skill in the art.

The present invention also offers utility in other metal substrate coating applications. These additional applications include, but are not limited to wash coating, coil coating, sheet coating, and side seam coatings, e.g., food can side seam coatings.

The present invention will now be further described with respect to the following illustrative examples.

Example 1

Preparation of Solvent-Based Acrylic Used in Example 2

To a premix vessel was charged 236.44 parts of glacial methacylic acid, 118.21 parts styrene, 39.4 parts of ethyl acrylate, and 3.46 parts butanol. The mixture was stirred until uniform and 25.34 parts of 70% benzoyl peroxide wetted with water were added. The mixture was stirred until uniform, about 30 minutes. Added to a 4 neck round-bottom reactor equipped with a mechanical stirrer, water cooled condenser, nitrogen inlet, a heating mantle, and a thermocouple connected to a heating controlling device was 43.9 parts of the premix, 163.2 parts of n-butanol, and 13.63 parts of deionized water. The reactor was heated with a nitrogen blanket to about 88° C., and the reactor was allowed to exotherm to between 93-101° C. When the temperature range was achieved, it was held for 15 minutes. When the heat-up started, 236.22 parts n-butanol and 18.91 water were added while stirring to the premix vessel. At the end of the 15 minutes, the premix was added above the surface to the reactor over the course of 2 hours, while maintaining a temperature of 93-101° C. When the addition was complete, the premix vessel was flushed with 34.26 parts of n-butanol and added to the reactor. The reactor was held at 93-101° C. for an additional 2.5 hours. At the end of the hold, 110.87 parts of butyl glycol was added and cooled to room temperature. After the batch was discharged, it had a solids content of 39.4%, and a viscosity of 16,000 cps at 25° C.

Example 2

Preparation of Inverted Aqueous Dispersion Comprising Phenolic Resin Content This composition was made with a monomer premix, a initiator premix, and a 4 neck round bottom reactor equipped with a mechanical stirrer, water cooled condenser, nitrogen inlet, a heating mantle, and a thermocouple connected to a heating controlling device. To the monomer premix was added 102.89 parts styrene, 8.13 parts butyl glycol, 28.81 parts of hydroxypropyl methacrylate, and 5.49 parts of glycidyl methacrylate. This mixture was stirred for uniformity for 30 minutes. To the initiator premix vessel was added 11.5 parts t-butyl peroctoate and 9.37 parts of butyl glycol. This initiator premix was stirred for 30 minutes for uniformity. To the reactor was added 32.14 parts of n-butanol and 24.24 parts of butyl glycol. A nitrogen blanket was started and the reactor was heated with stirring to 94-104° C., at which time 1.81 parts t-butyl peroctoate was added and flushed with 0.35 parts butyl glycol. After holding at temperature for 5 minutes, the monomer and initiator premixes began feeding into the reactor simultaneously. The monomer premix was fed over 105 minutes and the initiator premix was added over 165 minutes. At the end of the monomer premix, the vessel was flushed with 7.38 parts of butyl glycol and added to the reactor. At the end of the initiator premix, the vessel was flushed with 8.86 parts of butyl glycol and added to the reactor and held for 1 hour. Throughout this process, the temperature was maintained between 94-104° C. At the end of the 1 hour hold, 0.55 parts t-butyl peroctoate and 0.35 parts butyl glycol were premixed and added to the reactor. At the end of the 1 hour hold, 0.55 parts t-butyl peroctoate and 0.35 parts butyl glycol were premixed and added to the reactor. At the end of the 1 hour hold, 0.55 parts t-butyl peroctoate and 0.35 parts butyl glycol were premixed and added to the reactor. The temperature was held for 1 more hour, at which time the temperature was raised to between 113-117° C. While temperature was reached, 104.97 parts of the solvent-based acrylic from Example 1 was added, followed by 4.81 parts of hexyl glycol. When temperature was reached, 15.05 parts of dimethyl ethanol amine were added over 5 minutes. When addition was complete, the reactor was held at temperature for 4 hours. At the end of the hold, 40.23 parts of deionized water were added and the temperature was dropped to 90° C. When temperature was reached, 125.32 parts of Varcum 29-401 resole phenolic was added over 1 hour. At this point hold for 1 hour as the temperature was dropped to 80° C. At this point, the phenolic was dissolved and 465.94 parts of deionized water were added over 1 hour and the temperature was allowed to drift to 49° C. At this point, the reactor was stirred for 30 minutes and cooled to 38° C. prior to discharging. The resin dispersion had a solids of 29.3, viscosity of 400 centipoise at 25° C., pH of 7.25, and a particle size of 0.30 microns.

Example 3

Preparation of Latex Composition

An acrylic latex was made according to the teachings of U.S. Pat. No. 7,592,047.

Example 4

Preparation of Aqueous Coating Composition 31.8 parts by weight of the inverted aqueous dispersion of Example 2 was provided. 6 parts by weight of an additional phenolic resin (Bakelite 6535 phenolic resin), 2 parts by weight butanol, 1.7 parts by weight of amyl alcohol, 0.2 parts by weight of hexyl cellusolve were added to the dispersion. The ingredients were mixed for one hour to provide a mixed admixture. Then, 37.9 parts by weight of the latex composition of Example 3 and 0.2 parts by weight of a defoaming agent were added to the mixed admixture. The resultant admixture is mixed for 2 hours. 19 parts by weight of water were then added and mixed for 30 minutes.

Example 5

Spray, Cure and Corrosion Performance of Example 4 in D&I Tinplate Cans

One of the potential uses of the instant invention is as a waterborne spray coating for the interior of tinplate, drawn and ironed (D&I), two-piece food cans. These types of cans are becoming increasingly more prevalent within the food can industry.

To facilitate 'spray-application' of the coating prototype to the interior of commercially available, preformed, tinplate D&I cans, the viscosity of the coating composition of Example 4 was reduced such that the flow rate through a Ford viscosity cup (#4 orifice) is in the range of 16-30 seconds. This viscosity measurement was conducted with clean, filtered coating at a temperature of 25° C.

The application the coating was conducted using a laboratory scale D&I spray unit commercially available from H. L. Fisher Co. This laboratory unit is considered an effective replica of commercial D&I spray units.

The application and testing of the coating was performed on commercially available tinplate D&I cans with the commercial dimensions identified as '300×407'. This indicates a commercial can size whose height is 0.113 m and whose diameter is 0.076 in. This yielded a can whose internal area is 0.032 m$^2$. All of the cans that were used for testing were also given the familiar 'sidewall beading' which imparted improved crush resistance to the can. In addition, each can was 'flanged', which allows for effective seaming/closure of the can with an appropriate '300 diameter' commercially available food can end.

For the gold coatings a sufficient amount of wet coating was delivered to the interior of the D&I can to yield a total, cured film weight of 250.0 mg per can. The white coatings were applied such that a total, cured film weight of 350.0 mg per can was obtained. These coating weights are consistent with those currently employed in the production of full scale, commercially coated tinplate D&I cans.

The cans were thermally cured using a laboratory-scale D&I can oven commercially available from Ross Co. The controls on this oven were programmed to deliver a thermal dosage that is consistent with thermal dosages employed in the preparation of commercially coated tinplate D&I cans. The residence time of each can within the oven was approximately 5.5 minutes. Each can achieved a maximum temperature of approximately 221° C. Each can was at a minimum temperature of 213° C. for approximately 2.0 minutes. Following this thermal drying process, an assessment of the coating's appearance, uniformity (dry film continuity) and other application-related properties was collected.

When these cans were packed with a wide variety of foods, this coating showed performance very similar to industry standards, including dropped damage.

What is claimed is:

1. A method of making a coating composition, comprising:
    a) providing an inverted aqueous dispersion comprising:
        i) at least one resin having one or more polar, hydrophilic groups, wherein the resin having one or more polar, hydrophilic groups has a number average molecular weight in the range from 2000-15000, and
        ii) at least one phenolic resin;
    b) providing a latex composition; and
    c) blending the latex composition with the inverted aqueous dispersion to form the coating composition, wherein the amount in step a) of the one or more resins having one or more polar, hydrophilic groups is in the range from 0.5-25 parts by weight per 100 parts by weight of the inverted aqueous dispersion and the amount in step a) of the one or more phenolic resins is in the range from 0.05-80 parts by weight per 100 parts by weight of the inverted aqueous dispersion.

2. The method of claim 1, wherein the at least one phenolic resin comprises at least one substituted phenolic resin.

3. The method of claim 1, wherein the at least one phenolic resin comprises at least one mono-substituted phenolic resin.

4. The method of claim 1, wherein the at least one resin comprises an acrylic polymeric surfactant.

5. The method of claim 1, wherein the inverted aqueous dispersion comprises from 2 to 20 parts by weight of one or more phenolic resins per 100 parts by weight of the inverted aqueous dispersion.

6. The method of claim 1, wherein the one or more polar, hydrophilic groups comprise quaternary ammonium group.

7. The method of claim 1, wherein the one or more polar, hydrophilic groups comprise carboxylic acid and/or carboxylic acid salt group.

8. The method of claim 1, wherein the one or more polar, hydrophilic groups comprise epoxide group.

9. The method of claim 1, wherein at least one of the resins having polar, hydrophilic group in step (a) has a number average molecular weight in the range from 2000 to 6000.

10. The method of claim 1, wherein at least one of the resins having polar, hydrophilic group in step (a) is derived from ingredients comprising (i) at least one epoxide functional reactant, (ii) at least one acid, acid salt, or acid anhydride functional reactant, and (iii) at least one tertiary amine.

11. The method of claim 1, wherein at least one of the resins having polar, hydrophilic group in step (a) has an acid number in the range from 15 to 400.

12. The method of claim 1, wherein at least one of the resins having polar, hydrophilic group in step (a) is derived from one or more ingredients comprising acid anhydride functionality.

13. The method of claim 1, wherein step (a) comprises (i) providing an organic dispersion and (ii) adding an amount of water to the organic dispersion effective to convert the organic dispersion to the inverted aqueous dispersion.

14. The method of claim 1, wherein the latex composition in step (b) comprises a resin surfactant.

15. The method of claim 1, wherein the latex composition in step (b) comprises a free radically polymerized resin surfactant.

16. The method of claim 1, wherein the latex composition in step (b) comprises a resin surfactant comprising quaternary ammonium group.

17. The method of claim 1, wherein the latex composition in step (b) comprises a resin surfactant comprising epoxide group.

18. The method of claim 1, wherein the latex composition in step (b) comprises a resin surfactant comprising acid or acid salt group.

19. The method of claim 1, wherein the latex composition in step (b) comprises a resin surfactant derived from ingredients comprising an epoxide functional reactant, an acid or acid salt functional reactant, and a tertiary amine.

20. The method of claim 1, wherein the latex composition in step (b) comprises a resin surfactant derived from one or more ingredients comprising acid anhydride group.

21. The method of claim 1, wherein the amount in step (b) of the latex composition is about 40 parts by weight per 100 parts by weight of the coating composition.

22. A food or beverage container, comprising:
a) a metallic surface; and
b) at least one coating providing on the surface, said coating derived from a coating composition comprising an inverted aqueous dispersion comprising: i) at least one resin having one or more polar, hydrophilic groups, wherein the resin having one or more polar, hydrophilic groups has a number average molecular weight in the range from 2000-15000; and ii) at least one phenolic resin; and a latex composition blended with the inverted aqueous dispersion, wherein the amount of the one or more resins having one or more polar, hydrophilic groups is in the range from 0.5-25 parts by weight per 100 parts by weight of the inverted aqueous dispersion and the amount of the one or more phenolic resins is in the range from 0.05-80 parts by weight per 100 parts by weight of the inverted aqueous dispersion.

23. A coating composition comprising:
a) an inverted aqueous dispersion comprising:
   i) at least one resin having one or more polar, hydrophilic groups, wherein the resin having one or more polar, hydrophilic groups has a number average molecular weight in the range from 2000-15000; and
   ii) at least one phenolic resin; and
b) a latex composition, wherein a) and b) are blended in the coating composition, and wherein the amount of the one or more resins having one or more polar, hydrophilic groups is in the range from 0.5-25 parts by weight per 100 parts by weight of the inverted aqueous dispersion and the amount of the one or more phenolic resins is in the range from 0.05-80 parts by weight per 100 parts by weight of the inverted aqueous dispersion.

24. A method of using a coating composition comprising the step of coating the surface of food or beverage container with a coating composition comprising:
a) an inverted aqueous dispersion comprising:
   i) at least one resin having one or more polar, hydrophilic groups, wherein the resin having one or more polar, hydrophilic groups has a number average molecular weight in the range from 2000-15000; and
   ii) at least one phenolic resin; and
b) a latex composition, wherein a) and b) are blended in the coating composition and wherein the amount of the one or more resins having one or more polar, hydrophilic groups is in the range from 0.5-25 parts by weight per 100 parts by weight of the inverted aqueous dispersion and the amount of the one or more phenolic resins is in the range from 0.05-80 parts by weight per 100 parts by weight of the inverted aqueous dispersion.

25. The method of claim 1, wherein said resin having one or more polar, hydrophilic groups is prepared from a reaction mixture including at least 20 wt. % unsaturated monomer(s) comprising acid or salt thereof and/or acid anhydride functionality, and the balance other free radically reactive monomer(s).

* * * * *